UNITED STATES PATENT OFFICE.

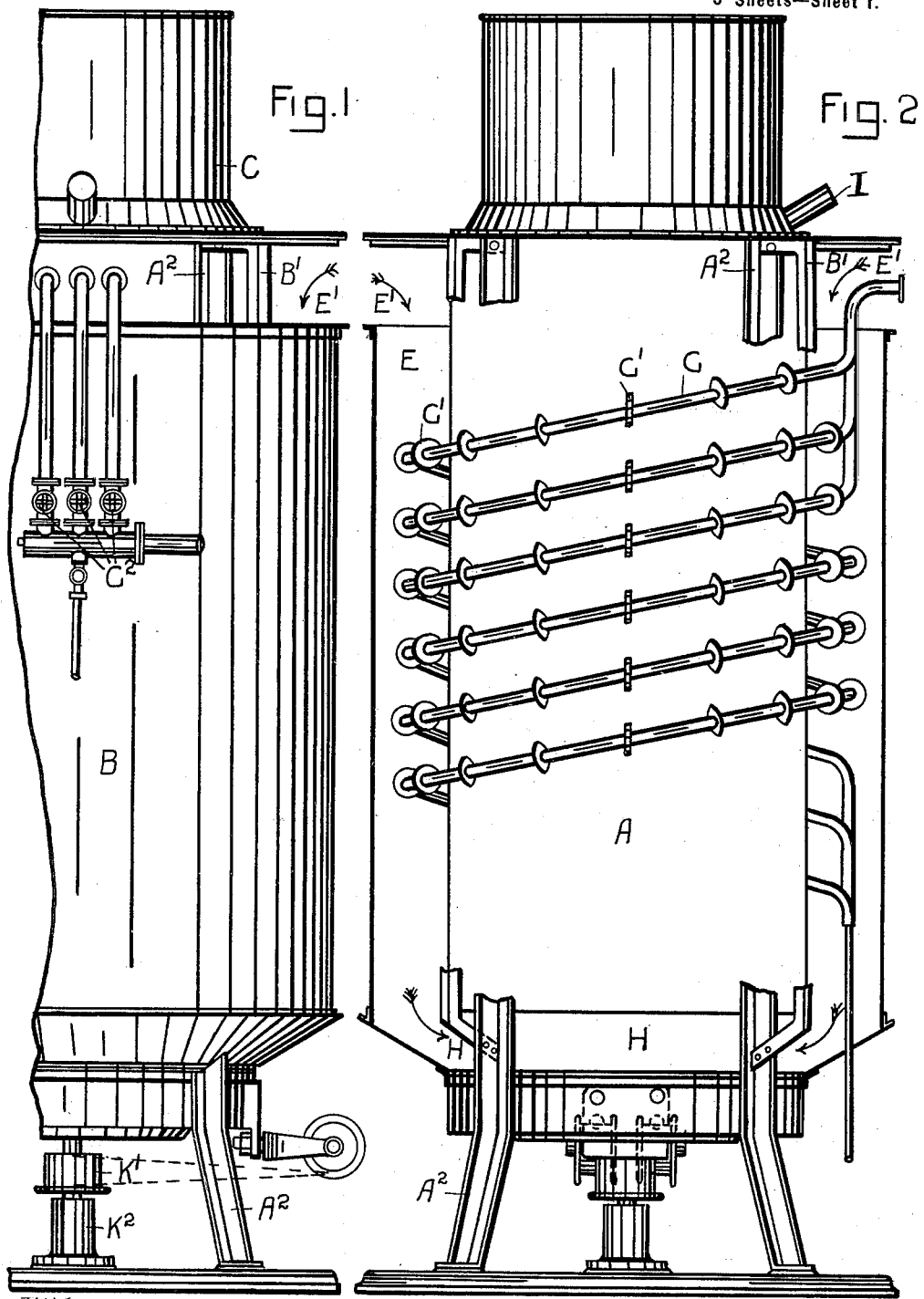

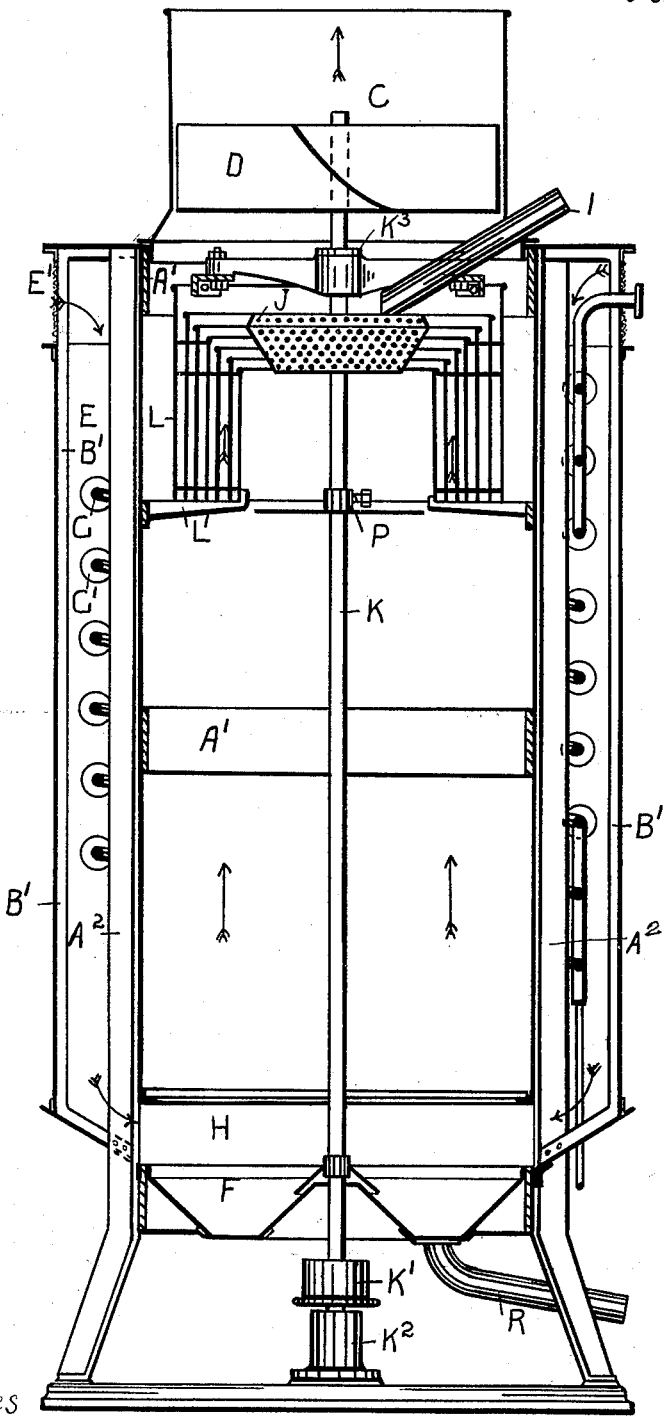

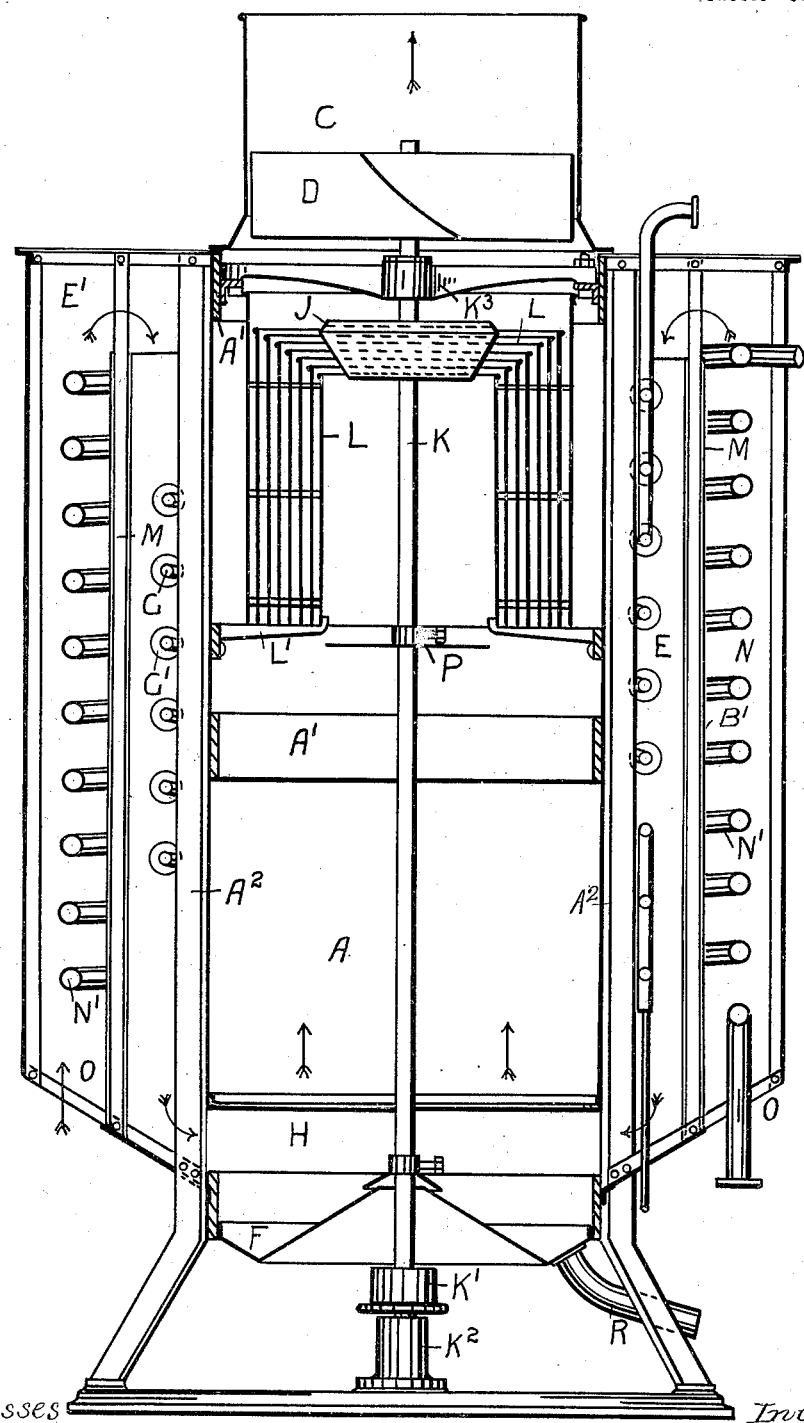

CHARLES G. HEPBURN, OF SYDNEY, NEW SOUTH WALES.

APPARATUS FOR TREATING OILS OR FATS.

SPECIFICATION forming part of Letters Patent No. 610,812, dated September 13, 1898.

Application filed December 23, 1897. Serial No. 663,259. (No model.)

*To all whom it may concern:*

Be it known that I, CHARLES G. HEPBURN, engineer, a subject of the Queen of Great Britain and Ireland, residing at Sydney, in the Colony of New South Wales, have invented new and useful Improvements in Apparatus for Treating Fats and Oils, of which the following is a specification.

This invention relates to apparatus for drying, air-blowing, and cooling fats and oils. It has been devised chiefly for treating hot liquid fats, such as tallow, which have been obtained by boiling, to extract residual water from them and to reduce their temperature; but it is usable generally for drying, cooling, and air-blowing oils and fats which are capable of being heated or aerated without injury.

According to my invention the oil or the fat, heated until it becomes freely liquid, is sprayed by a centrifugal-action device and the spray intercepted by a series of circular baffles, which drip it as rain through an ascending current of air at a regulated temperature.

The apparatus consists of a cylindrical chamber with annular casings or jackets, in which the air is warmed or warmed and dried, an air-propeller for inducing a current of air, a centrifugal sprayer, and baffles encircling the sprayer. There are certain structural features which will be hereinafter referred to in detail.

In the annexed drawings, Figure 1 is a fragment elevation of the apparatus; Fig. 2, a sectional elevation; Fig. 3, a vertical section through same, and Fig. 4 a vertical section through a modified construction of same.

The interior barrel or shell A is reinforced by rings A' and by angle-irons A², which are produced to form standards. An external shell B is built on light angle-irons B', sprung from the shell A or its reinforcements. The shell A terminates at the head in a funnel or exhaust-piece C of diminished diameter, in which an air-propeller D is placed. For the air-propeller D there may be substituted a centrifugal blower arranged to draw air from the interior of the shell A, or a centrifugal or other blower or air-propeller may be arranged to blow air into the annular space E. The bottom of the chamber A is formed of thin metal to the shape of an annular dish or tray F, from the bottom of which refined oil or fat is drawn off through a pipe R. This dish or tray may be provided with a water-jacket, by means of which its temperature may be controlled and the temperature of the oil or fat contained in it thus raised or lowered. The annular space E is open at points E' about its upper part, and through these apertures E' air passes into it from the external atmosphere. Said air is heated by contact with the convolutions of pipe G, through which steam is circulated, and after being so heated enters the inner chamber A through the apertures H in the shell thereof. The efficiency of the heating-coils G may be improved by arming them with radiating-disks G'. Thence the air-current passes upward through said chamber, acting upon a falling rain or spray of fat or oil therein, to the air-propeller D and thence into the atmosphere through C. The apertures E' should be of ample dimensions and clothed with a fabric which will exclude dust but pass air. The pipes G are arranged in three parallel sets served by separate valves G², so that any one or more of the coils may be thrown into action, as may be necessary. The lower end of each coil terminates in a drain-valve, which is kept sufficiently open to drain but to retain a little water in the end of the pipe and so prevent loss of steam. When the atmospheric air is sufficiently dry and warm, the steam-service need not be used.

I is the spout through which the oil or hot fat is run into the machine. From this spout it passes into the sprayer J, which consists of a return-edged saucer made of finely-perforated sheet metal. The sprayer J is mounted on a vertical spindle K, (on which also the fan D is mounted,) having a driving-pulley K' and a foot-step K⁴ and head-bearing K³. It is rotated at a velocity which will cause liquid to fly outward in a spray, which will be intercepted by the distributer L. This distributer consists of a series of deep concentric rings made of thin metal and mounted on brackets L'. The intercepted liquid trickles over the surfaces of these deep rings in thin layers and ultimately drips from their bottom edges into the receiving-tray F. The whole body of liquid under treatment is acted on by the passing currents of air while it is in a very fine state of division, and the air has therefore a maximum effect on it. The temperature of the air is regulated by the steam-coils and its volume proportioned by the speed of the fan, so that the fat or oil will pass from the tray F at a temperature suited for immediate packaging. The draft induced by the air-propeller must not be powerful enough to blow the spray out of the funnel C. The action of the apparatus is rapid, and as it is capable of treating liquids which enter it at a high temperature the employment of cooling-off tanks and the delay incidental to cooling therein by radiation are entirely avoided. A large proportion (but rarely the whole) of the water always contained in boiled fats, such as digester-tallow, is evaporated during the cooling process to a far greater degree than is possible when cooling-tanks are used, and the rapid cooling improves the general appearance of the product. A baffle P is fitted on the spindle K to deflect the current of air into the distributer L.

In order to obtain a maximum drying effect, the air is dried before being brought into contact with the liquid under treatment. This may be conveniently effected by chilling the air by contact with cold pipes through which cooled brine is being run before it enters the annular space E. A modified construction of apparatus for effecting this purpose is illustrated in Fig. 4, in which an annular dead-air space M for insulation purposes is formed about the heating-space E and a cool chamber N with cold pipes N' made to inclose the same. Atmospheric air is in this case admitted at O and flowing upward in contact with the pipes N' deposits a portion of its moisture therein and subsequently in passing downward through the chamber E is reheated to the necessary temperature and so has its capacity for absorbing moisture increased. Otherwise the construction is the same as that shown in Figs. 1, 2, and 3, except that the distributer L is made of larger area.

The mode of operation is as follows: The fan D or the air-propelling or air-sucking appliance used in the place thereof is put in motion and steam turned on to the pipes G. A current of air will thus be taken from the atmosphere, warmed in the chamber E, and made to pass up through the entire length of the chamber A. A stream of liquefied fat or oil at whatever temperature it is left by the preceding operation is now run in through the supply-pipe I and entering the sprayer J is thrown outward in a fine spray. It is intercepted by the conically-arranged upper edges of the distributer L and passes down over the surfaces of the same in thin films or streams and dripping off the lower edges falls as rain through the lower part of the chamber A onto the tray F, whence it passes to the packages through the pipe R.

When the modified construction of apparatus shown in Fig. 4 is used, the entering air first passes through the drying-chamber N and deposits a portion of its moisture therein before entering the warming-chamber E.

Having now particularly described and ascertained the nature of my said invention and in what manner the same is to be performed, I declare that what I claim is—

1. Apparatus for the purpose set forth, consisting of a vertical chamber through which a current of air is made to pass upwardly, a spraying device in the upper part of said chamber, a distributer below the sprayer, a tray in the bottom of said chamber for collecting the treated liquid, an annular chamber in which said air is heated, and an annular chamber in which said air is dried, substantially as described.

2. An apparatus of the character described comprising a suitable chamber having a tray at the lower part thereof, means for creating an upward current of air through said chamber, a laterally-discharging sprayer at the upper part of the chamber, and a vertically-arranged distributer adjacent to said sprayer and adapted to receive matter ejected therefrom and to discharge the same in a shower down through the chamber in opposition to the ascending air-current, said distributer consisting of a nest of concentric rings or annuli of varying height surrounding the sprayer.

3. An apparatus of the character described comprising a suitable chamber, means for creating an upward current of air therethrough, a vertically-arranged distributer in the upper part of said chamber consisting of a nest of concentric rings or annuli of varying heights, and means for spraying the matter under treatment into the spaces between said rings.

4. An apparatus of the character described comprising a vertical chamber, a shaft or spindle extending therethrough, a centrifugal sprayer on said shaft, an exhaust-fan on the shaft above the sprayer, and a vertically-arranged distributer adjacent to the sprayer and adapted to receive matter ejected therefrom and to discharge the same in a shower down through the chamber in opposition to the air-current created by the fan.

5. An apparatus of the character described comprising a suitable chamber, a heating-space around the same and communicating therewith at its lower end, a steam-coil in said heating-space, a drying-space around the heating-space and communicating with the same at the upper end thereof, a cold-pipe coil in said drying-space, means for creating an upward current of air through the chamber, and means for causing the matter under treatment to descend in a shower through the latter.

6. An apparatus of the character described comprising a suitable chamber, a heating-space around the same and communicating therewith at its lower end, a steam-coil in said heating-space, a drying-space around the heating-space and communicating with the same at the upper end thereof, a cold-pipe coil in said drying-space, a dead-air space between the heating and drying spaces, means for creating an upward current of air through the chamber, and means for causing the matter under treatment to descend in a shower through the latter.

7. An apparatus of the character described comprising a suitable chamber, means for creating an upward current of air therethrough, a laterally-discharging sprayer at the upper part of the chamber, a vertically-arranged distributer around said sprayer, and a centrally-located baffle-plate below the distributer to direct the air through the same.

In testimony whereof I have signed my name to this specification in the presence of two subscribing witnesses.

CHARLES G. HEPBURN.

Witnesses:
W. I. SPRUSON,
W. J. DAVIS.